FENWICK & BOEKLEN.
Hand-Seeder.
No. 13,387. Patented Aug. 7, 1855.
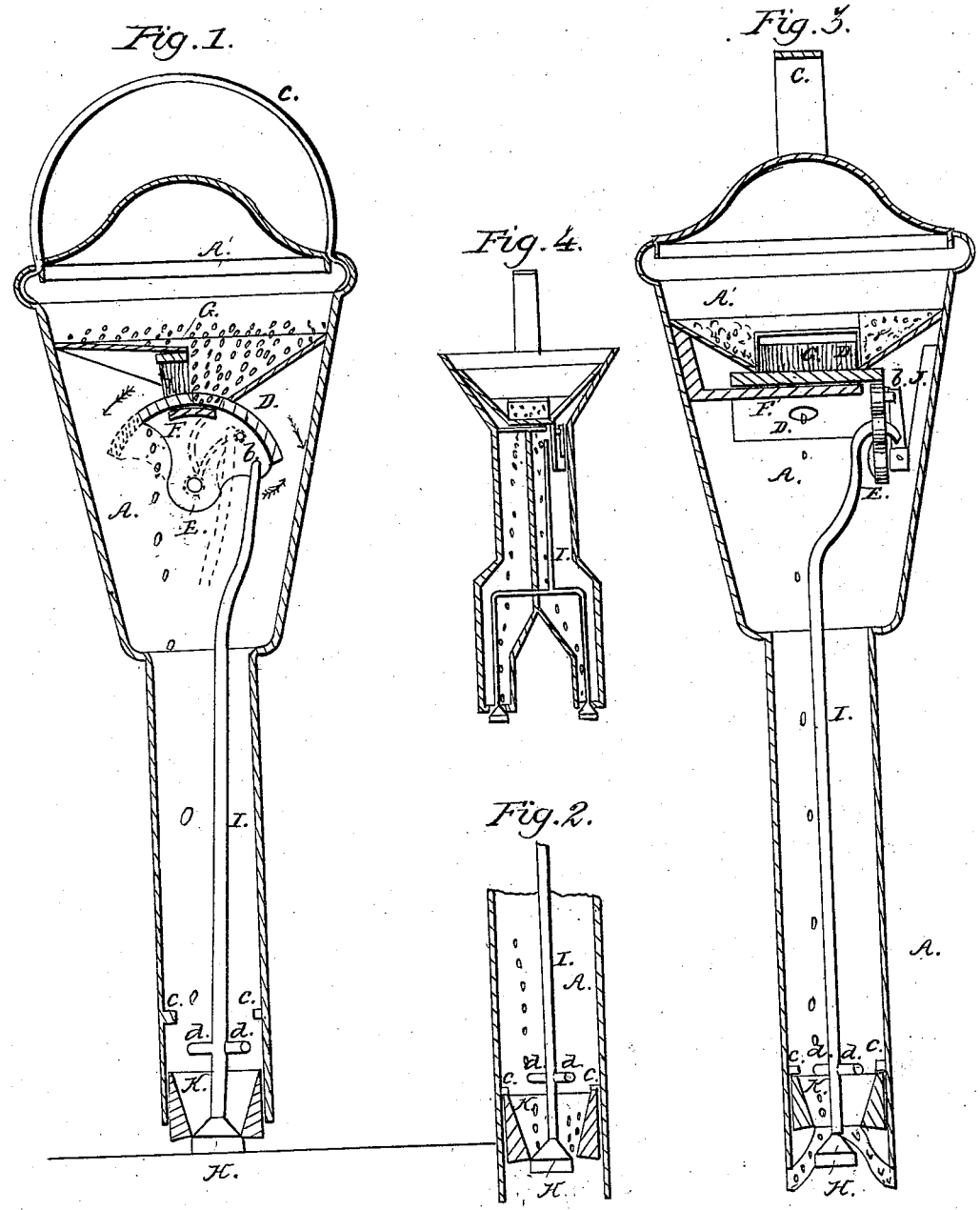

UNITED STATES PATENT OFFICE.

R. W. FENWICK, OF BROOKLYN, NEW YORK, AND R. BOEKLEN, OF JERSEY CITY, NEW JERSEY.

IMPROVEMENT IN CORN-PLANTERS.

Specification forming part of Letters Patent No. 13,387, dated August 7, 1855.

*To all whom it may concern:*

Be it known that we, ROBERT W. FENWICK and REINHOLD BOEKLEN, the former of Brooklyn, in the county of Kings and State of New York, and the latter of Jersey City, in the county of Hudson and State of New Jersey, have invented a new and useful Improvement in Hand Corn-Planters; and we do hereby declare that the following is a full, clear, and exact description of the same, reference being had to the accompanying drawings, making part of this specification, in which—

Figure 1 is a vertical transverse section of a hand corn-planter constructed after our invention as it appears before its end has been forced down into the soil. Fig. 2 is a similar section of the same as it appears after its end has been forced down into the soil. Fig. 3 is a vertical longitudinal section of the planter as it appears when its end has been raised partly out of the soil. Fig. 4 shows a modification of the planter.

Similar letters of reference indicate corresponding parts in the several figures.

The nature of our invention consists in a novel combination and arrangement, for operation together by alternate thrust and pull imparted to the exterior or planting tube, of a valve at the lower end of the said tube, with a seed-slide which forms part of a circle and is arranged to turn on a center, as will hereinafter be fully described. By this arrangement the end of the planting-tube will be closed, the seed-slide operated, and corn deposited into the lower portion of the planting-tube the moment the necessary downward movement to form the hole in the soil for the reception of the corn is imparted to the planter, and the planting-tube will again be opened, the corn allowed to escape into the hole formed for it, and the seed-slide returned to its original position, ready for another supply the moment the necessary upward movement to raise the planting-tube out of the soil is communicated to the planter. The slide at the bottom of the planting-tube effectually prevents the entrance of dirt, and thus insures a perfect and certain action of the planter. It also serves for operating the slide, as it yields as the planting-tube descends, and consequently turns the slide and remains stationary as it rises, and thereby causes the slide to resume its original position. It is by this method of operating the slide that the machine is simplified and the labor of planting diminished. The arranging of the slide to turn on a center and making it of a curved shape also add to the certainty of the operation of the planter, as the corn is agitated by the circular movement of the slide and caused to fall into the cup or cell in almost every instance, which is not the case with the straight horizontal or vertical slide commonly used.

To enable others to fully understand our invention, we will proceed to describe its construction and operation.

A represents the planting-tube, made as shown or of any other suitable form. It is provided with hopper A' to receive the corn and feed it to the slide, and also with a handle, C, to carry and operate it by, as shown.

D is the slide, arranged in the center of the planting-tube on an axis, E, as shown.

F is a circular seat for it to play over. This seat serves also for closing the bottom of the seed cell or cup *a* of the slide while it is charging itself with corn, as illustrated. It, however, does not interfere with the escape of the corn from said cell or cup when the slide occupies the position shown in red in Fig. 1.

G is a brush for brushing off surplus grains as the slide-cell moves from under the hopper. It also serves for preventing the corn being bruised in its passage from the hopper to the planting-tube.

H is the valve at the bottom of the planting-tube. It is made conical, so as to spread the corn in its escape from the tube.

I is the rod connecting the valve to the seed-slide. It will be seen that this rod is secured loosely in a hole in the slide, which stands eccentric to the axis E, and consequently the slide is turned when the planter is depressed, by reason of the resistance offered by the soil to the valve.

J is a spring attached to the axis E and bearing against a stop, *b*, of the slide. This spring yields when the planter is depressed, as shown in Fig. 2, and again assumes its shape when the planter is raised, as in Figs. 1 and 3. Its office is to throw the slide back to its original position when the planter is raised, as just stated.

K is the loose ring or bottom. It slides freely in the planting-tube, and is just large enough in diameter to have the valve fit snugly in it, as shown.

$c\ c$ are stops on the inside of the planting-tube to prevent the ring or bottom rising too high.

$d\ d$ are arms on the connecting-rod for causing the ring to descend as the planter is raised.

Operation: The farmer takes hold of the handle C with one hand, and presses the planting-tube into the soil, thereby forming the hole for the corn. As the tube descends the valve closes the opening of the loose collar or bottom and also forces the collar or bottom to the position shown in Fig. 2, it being prevented from descending into the soil as deep as the tube on account of the spring J yielding to the resistance of the soil and allowing the slide to turn and assume the position shown in red. By causing the slide to assume this position corn is deposited into the planting-tube, as shown in Fig. 2. The planter is now raised by its handle, as illustrated in Fig. 3. In thus raising it the valve opens and the corn escapes into the hole formed for it. The dirt lifted up by the tube is almost instantly forced from under the bottom or ring K by the ring or bottom itself, it being caused to descend by the arms $d\ d$ of the valve-rod acting against it, they being thus caused to act by reason of the planting-tube being raised a little above the soil, as in Fig. 1. The dirt, as it is forced from under the bottom or ring, falls upon and covers the corn.

By examining Fig. 4 it will be seen that two or more valves may be employed, a tube being provided for each, as shown, and all operated at the same time, and each aiding in operating the slide through the valve-rod I.

We claim nothing new in the loose covering interior ring or tube, K, separately considered, at the bottom of the planting-tube, and are aware that a conical valve at the bottom of the planting-tube, connected with a seed-delivery slide, for operation together, by a lever or handle, distinct from any thrust or pull imparted to the tube itself, and employing a much more complicated and different arrangement of operating-gear, has before been used. Such devices, therefore, nor simply their operation together, of itself, we do not claim; but

We do claim as new and useful and desire to secure by Letters Patent—

The combination and arrangement, as herein shown, of the swinging seed-slide D, valve H, and tube K, for the purpose set forth.

ROBT. W. FENWICK.
R. BOEKLEN.

Witnesses:
JOHN MASON,
JOHN W. JACKSON.